(No Model.)
A. H. KLINGLER.
BRAKE FOR TROLLEY CARS.
No. 605,485. Patented June 14, 1898.
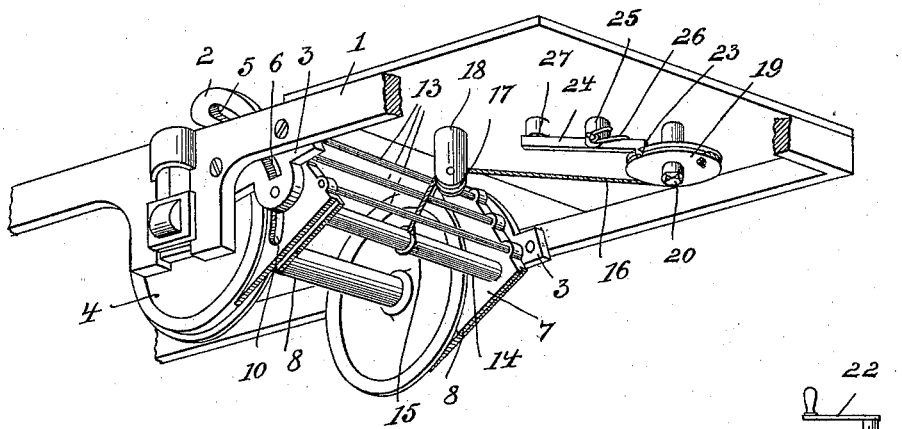
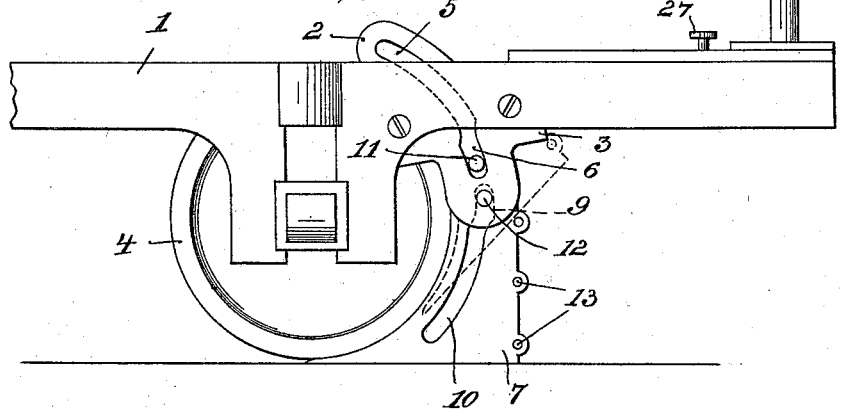
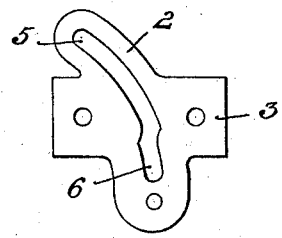
Witnesses:
Wilhelm Vogt
Thomas M. Smith
Inventor:
Aloysius H. Klingler
By J. Walter Douglas
Attorney.

UNITED STATES PATENT OFFICE.

ALOYSIUS H. KLINGLER, OF RIDLEY PARK, PENNSYLVANIA.

BRAKE FOR TROLLEY-CARS.

SPECIFICATION forming part of Letters Patent No. 605,485, dated June 14, 1898.

Application filed February 20, 1897. Serial No. 624,411. (No model.)

*To all whom it may concern:*

Be it known that I, ALOYSIUS H. KLINGLER, a citizen of the United States, residing at Ridley Park, in the county of Delaware and State of Pennsylvania, have invented certain new and useful Improvements in Brakes and Fenders for Trolley-Cars, of which the following is a specification.

My invention relates to a combined brake and fender for motor and other railway cars, and in such connection it relates to the construction and arrangement of the brake and fender and actuating and controlling mechanism therefor.

The principal object of my invention is to provide a comparatively simple, durable, and effective brake and fender for a motor or other railway car actuated by a hand-lever from a platform of the car to elevate the brake and fender into inoperative position and controlled by a spring pawl-locking lever actuated by a foot device to release the brake and fender to cause the same to be brought into contact with the surface of the wheels and the flanged base of the brake-shoes of the fender to engage and slide on the reversely-flanged tracks or ways of the road, and also in the engagement of the shoes of the fender with the wheels in operative position to raise the same slightly from the tracks or ways of the road, and thereby not only to retard or stop the car, but also by reason of the arrangement of the fender of my invention to prevent a person struck by the car to which the same is applied from coming into contact with the wheels or of passing between them beneath the car in its travel, hence affording a greater protection to pedestrians against the loss of life or limb in the use of my invention upon motor or other cars.

My invention consists of a combined brake and fender for motor and other cars when constructed and arranged in substantially the manner hereinafter described and claimed.

The nature and objects of my invention will be more fully understood from the following description, taken in connection with the accompanying drawings, forming part hereof, in which—

Figure 1 is a perspective view of the under portion of a car-truck with a combined brake and fender embodying the features of my invention shown in application, the same being illustrated partially raised or in inoperative position. Fig. 2 is a side elevational view of the brake and fender of my invention in a lowered or operative position, and Fig. 3 is a detached side elevational view of one of the slotted standards adapted to be secured to the car-truck and with which slides the shoes of the brake and fender of my invention.

Referring to the drawings, 1 represents the truck-frame of the car, and to the same at either or both ends are secured the slotted standards 2 by means of screws or bolts introduced through the openings in the lugs 3 of said standards. These standards 2 are located in advance of wheels 4 of the car and project in their secured position to the truck-frame 1 above the wheels 4, as clearly illustrated in Figs. 1 and 2 of the drawings. As illustrated, the curved and slotted standards 2 at 5 and 6 are of different radii, so as to provide a slot of irregular shape or form for purposes to be presently fully explained.

The brake and fender consist of the two end pieces or shoes 7, having the base of each flanged at 8 reversely to the flange of the tracks or ways of the road, so as to engage and slide thereon. The inner edges of the end pieces or shoes 7 are curved, so as to conform to the contour of the wheels 4 of the car, and in the outer side walls of these end pieces or shoes 7 are provided grooves or recesses 9 and 10 of different radii substantially complemental to those in the standards 2 in order to permit in the elevation of the end pieces or brake-shoes 7 into inoperative position, the same to occupy a position free from the wheels 4 of the car. At the upper ends of the end pieces or brake-shoes 7 are provided pins 11, which project into the slotted standards, in which they are adapted to move, and at the lower ends of the standards are provided pins 12, which enter the grooves or recesses of the brake-shoes 7, as clearly illustrated in Fig. 2 of the drawings. Each pair of brake-shoes 7 are connected with each other by means of a series of cross-bars or similar devices 13 to constitute the fender part of my present invention and which may be suitably covered with a yielding material or substance in order to lessen the thud or blow of an object against the same. The cross-bar 14, so provided at and secured to the lower portion of the brake-shoes 7, is to firmly hold the same the required distance apart in a rigid condition.

16 is a chain or cord suitably connected at 15 with the cross-bar 14 and passing over a pulley 17, journaled to a lug or projection 18, depending from the under side of the platform of the car, the end of the said chain or cord being attached to a grooved wheel 19. This wheel 19 is rigidly secured to a rotary shaft 20, extending vertically through the platform of the car, and a support 21, suitably held to said platform, and the said shaft is provided with a detachable handle 22 for actuating said shaft, and thereby winding said chain or cord 16 onto the said grooved wheel 19, or of permitting in the release of the hand from the said handle 22 of the said shaft being actuated in a reverse manner for unwinding the said chain or cord 16 from the said wheel 19, and thereby the fall of the brake and fender into an operative position, such as illustrated in Fig. 2, from its elevated or inoperative condition, being the position it occupies in Fig. 1 of the drawings. The upper face of the grooved chain-wheel 19 is notched at 23, so as to permit of the engagement therewith of the pawl of a lever 24, pivotally supported in a lug 25, secured to the under side of the platform of the car. A spring 26 embraces the lug 25, and the free end of the said spring engages the lever 24, so as to normally press and hold the pawl of said lever 24 in the notch 23 of the grooved chain or cord receiving wheel 19. The opposite end of the lever 24 is engaged by a stud-button or foot-piece 27, the shank portion of which button or piece extends through the platform of the car, as illustrated in Fig. 1, and is operated by the foot of the operative to actuate the pawl-locking lever 24 against the tension of the spring 26, normally holding the pawl of said lever in engagement with the top surface of the wheel 19 to release the pawl therefrom, and thereby to operate the shaft 20 to cause the respective brake-shoes and fender of my invention to assume an operative position with the respective shoes thereof in contact with the wheels 4 of the car and in sliding engagement with the tracks or ways of the road, and in such engagement slightly raising the wheels 4 to retard, as well as speedily stop, their rotation and at the same time the fender in such position as to prevent a person coming in contact with the wheels or of being carried beneath the car between the wheels thereof, thereby presenting a device with its accessories embodying my invention which is adapted to afford greater protection against the loss of life or limb to pedestrians brought unconsciously or otherwise in the path of a traveling motor or other railway car.

It will be understood that the normal position of the brake and fender of my invention is an elevated one beneath the car. When it is desired to bring the brake and fender into use, the foot-piece or button 27 is depressed by the operative, which releases the pawl of the lever 24 from the notch 23 of the grooved wheel 19, and the weight of the brake and fender will cause it to drop, unwinding the chain or cord 16 from the wheel 19, and assume a position just in advance of the respective car-wheels 4, which will ride upon the same and will be elevated slightly from the tracks or ways, and the flanges 8 of the brake-shoes 7 will guide the fender upon the tracks and prevent the wheels 4 of the car from sliding from the same.

When the combined fender and brake is not in use, the wheel 19 is rotated by the handle 22 to elevate, by means of the chain or cord 16, the same, and the irregular shape of the grooves in the outer surface of the brake-shoes 7, and also of the slots in the standard 2, enable in the elevating of the combined device of my invention being freed from the wheels 4 and retained in such position by the engagement of the pawl of the lever 24 with the notch 23 of the grooved wheel 19.

Having thus described the nature and objects of my invention, what I claim as new, and desire to secure by Letters Patent, is—

1. A combined brake and fender, comprising standards adapted to be secured to a car-truck frame and having slots of different radii as to the upper and lower portions thereof, brake-shoes provided with cross-bars to form a fender and said shoes having grooves or recesses in the walls of the same of different radii as to the upper and lower portions thereof, pins carried by said shoes and standards for engaging and moving in the slots and grooves respectively of said standards and shoes and means for actuating said brake-shoes in the slots of said standards, substantially as and for the purposes described.

2. A combined brake and fender, comprising standards adapted to be secured to a car-truck frame and provided with irregular slots, pins carried by said slotted standards, brake-shoes in the rear grooved out to contour with the car-wheels and in front provided with transverse means to form a fender, said shoes in the outer surfaces provided with irregular grooves or recesses adapted to be engaged by the pins of said standards, pins carried by said shoes and adapted to engage the irregular slots of said standards, whereby when said shoes are elevated said pins working in said irregular slots will cause the brake and fender to clear the car-wheels and means for actuating and controlling the positions of said fender and brake, substantially as and for the purposes described.

In testimony whereof I have signed this specification in the presence of two subscribing witnesses.

ALOYSIUS H. KLINGLER.

Witnesses:
JOHN BUCHANAN, Jr.,
HARRY H. TRETHEWAY.